Nov. 12, 1963 P. WINCHELL 3,110,501

LAMINATED DISC PAD PHONOGRAPH RECORDS

Filed Feb. 1, 1961

INVENTOR.
PAUL WINCHELL
BY
Zoltan H. Polachek
ATTORNEY 3,110,501
Patented Nov. 12, 1963

3,110,501

LAMINATED DISC PAD PHONOGRAPH RECORDS

Paul Winchell, Whitestone, N.Y., assignor to Chelwin Productions, Inc., New York, N.Y., a corporation of New York Filed Feb. 1, 1961, Ser. No. 86,403
1 Claim. (Cl. 274—42)

This invention relates to the phonograph record art and particularly concerns a pad of phonograph records.

According to the invention an album of phonograph record is fabricated as a pad of paper or plastic sheets with record grooves impressed thereon. The several sheets are detachably bound at the edges and can be torn off from the pad one at a time until the entire pad has been played. The invention is particularly useful for language learning and in other applications in which it is desired to remove or discard a record after one of a few plays.

It is one object of the invention to provide a pad of flexible paper or plastic records.

It is another object to provide a pad of rectangular or round phonograph record sheets, each sheet having a spiral record groove thereon.

Still another object is to provide a pad of phonograph record sheets, each sheet being in the form of an annular ring with a record groove impressed therein.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figures 1, 2, 3, 4, 5, 6, 7:
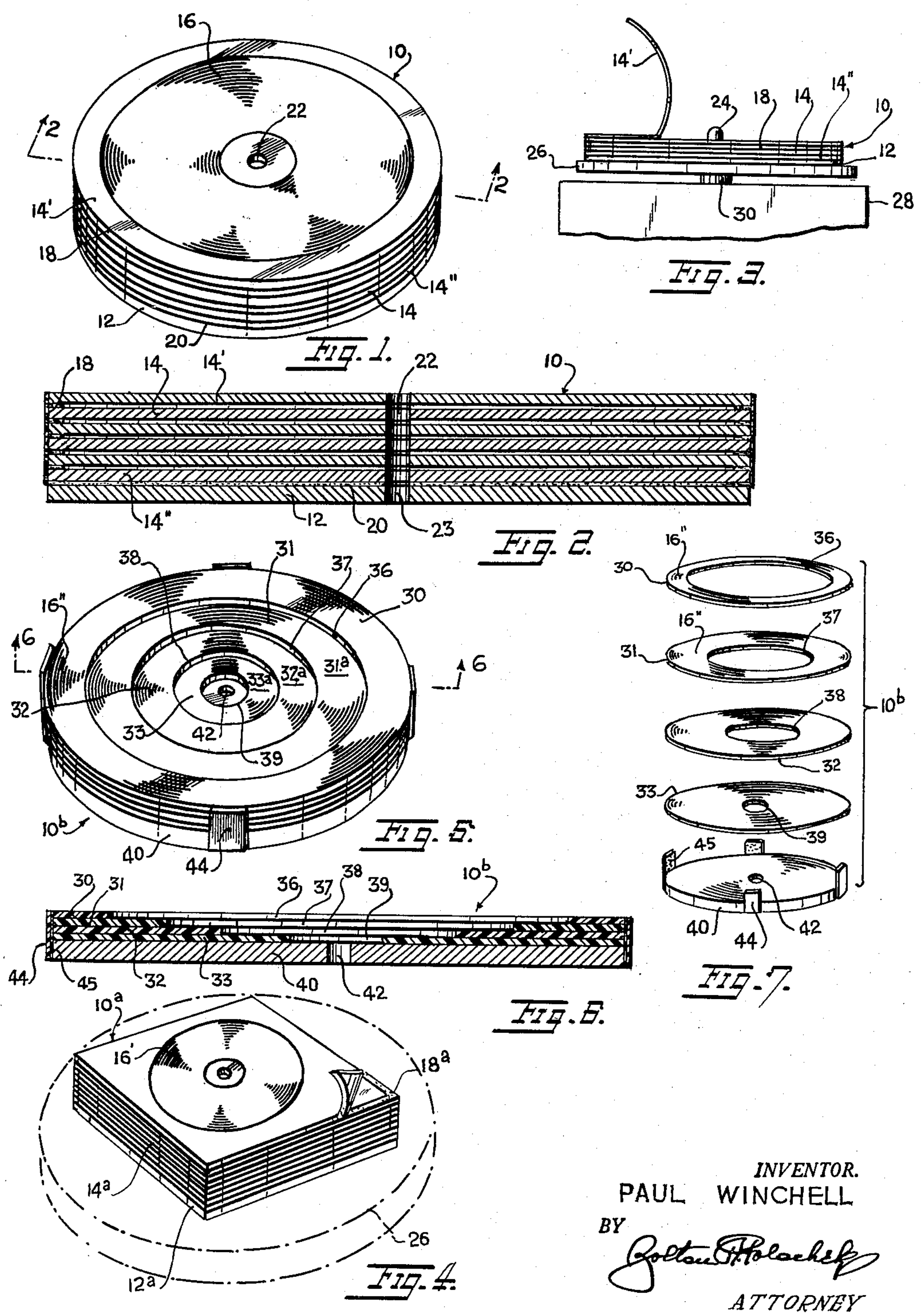
FIG. 1 is a perspective view of a pad of phonograph record sheets embodying the invention.
FIG. 2 is a sectional view on an enlarged scale taken on line 2—2 of FIG. 1.
FIG. 3 is a side elevational view of the pad of FIGS. 1 and 2 mounted on a phonograph turntable.
FIG. 4 is a perspective view of another phonograph record pad embodying the invention.
FIG. 5 is a perspective view of still another phonograph record pad according to the invention.
FIG. 6 is a sectional view taken on line 6—6 of FIG. 5.
FIG. 7 is an exploded perspective view of the pad of FIGS. 5 and 6.

Referring to the drawings, there is shown in FIGS. 1–3 a pad 10 including a round base disk or board 12 formed of cardboard or plastic. On this disk is mounted a stack of round paper or plastic sheets 14 each impressed with record grooves 16. The several sheets 14 are detachably secured to each other by annular rings 18 of a suitable adhesive. The sheets can be removed from the pad by peeling off the top sheet 14' as shown in FIG. 3. The bottom sheet 14'' is secured to the base disk by a layer of adhesive 20. Holes 22, 23 are formed centrally of the sheets and disk and are disposed in registration to receive the spindle 24 of a phonograph turntable 26. The turntable is mounted on a base 28 and turns on a shaft 30 as indicated in FIG. 3. After each record sheet has been played a number of times, the top sheet can be torn off from the pad so that the sheet underneath can be played.

In FIG. 4, the pad 10$^a$ consists of a rectangular base board 12$^a$ and rectangular flexible phonograph record sheets 14$^a$. Each sheet has spiral record grooves 16' impressed thereon. Rectangular marginal rings of adhesive 18$^a$ detachably secure the several sheets to each other. The maximum diagonal dimension of the pad should be smaller than the turntable 26 indicated in dotted lines in FIG. 4.

In FIGS. 5–7, the pad 10$^b$ consists of a plurality of flexible circular thin flat plastic bodies 30—33 impressed with spiral record grooves 16'', all of the bodies having the same diameter but provided with concentric openings 36–39 of progressively smaller diameter from the top body 30 to the bottom body 33. The thick circular base disk 40 carries the superimposed bodies. Disk 40 is a thick board of cardboard, plastic or the like. A central hole 42 of the disk 40 receives the spindle of the phonograph turntable. Plastic tabs 44 coated with an adhesive 45 are angularly spaced around the pad and detachably hold the bodies on the pad. The bodies can be peeled off in succession from the pad when playing of each body is completed. The pad is so arranged that exposed annular portions 31$^a$, 32$^a$, 33$^a$ of the lower bodies can be played by a phonograph pickup of conventional type without requiring removal of the upper bodies. When the upper body is removed then the body underneath thus exposed can be played completely.

If desired, the phonograph record sheets of pads 10 and 10$^a$ can be made in different sizes in each pad.

The present invention provides an album of phonograph records in a very compact package. The several sheets are inexpensive to fabricate and can be discarded when playing is completed.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A phonograph record pad, comprising a plurality of flexible sheets stacked to form a pad, a base board underlying the stacked sheets, said base board having the lowermost sheet adhesively secured thereto at their confronting faces, said base board having a hole to receive a spindle of a phonograph turntable, tabs spaced longitudinally with respect to said hole and angularly spaced around the outer peripheral edge of said sheets and base board, said tabs having adhesive to detachably secure said sheets to each other and to the base board, each of said sheets having a spiral record groove impressed thereon, each of the sheets having a flat circular body, all of the bodies having the same outermost diameter with central holes of progressively larger diameters from the lowermost to the uppermost sheet, so that portions of all of the bodies are exposed for playing.

References Cited in the file of this patent

UNITED STATES PATENTS

| | | |
|---|---|---|
| 1,502,312 | Mayhew | July 22, 1924 |
| 2,802,670 | Becton | Aug. 13, 1957 |

FOREIGN PATENTS

| | | |
|---|---|---|
| 800,996 | Great Britain | Sept. 3, 1958 |
| 1,195,640 | France | Mar. 19, 1959 |
| 1,198,858 | France | June 15, 1959 |